United States Patent [19]

Mitsumoto

[11] Patent Number: 5,188,219
[45] Date of Patent: Feb. 23, 1993

[54] HORIZONTAL ROTARY TRANSFER APPARATUS

[76] Inventor: Takayasu Mitsumoto, 1-26-5 Take, Yokosukashi, Kanagawa-ken, Japan

[21] Appl. No.: 896,572

[22] Filed: Jun. 10, 1992

Related U.S. Application Data

[60] Division of Ser. No. 763,176, Sep. 20, 1991, and a continuation-in-part of Ser. No. 500,540, Mar. 28, 1990, abandoned.

[30] Foreign Application Priority Data

Mar. 31, 1989 [JP] Japan .................................. 1-36386

[51] Int. Cl.⁵ .............................................. B65G 23/06
[52] U.S. Cl. ...................................... 198/834; 198/631
[58] Field of Search ........................ 198/631, 834, 835

[56] References Cited

U.S. PATENT DOCUMENTS

| | | | |
|---|---|---|---|
| 1,191,434 | 7/1916 | Keith | 198/833 |
| 1,864,822 | 6/1932 | Heuze | 198/793 |
| 2,446,890 | 7/1948 | Stadelman | 198/833 |
| 3,682,295 | 8/1972 | Roinestad | 198/833 |
| 3,780,852 | 12/1973 | Weiss et al. | 198/793 |
| 3,881,592 | 5/1975 | Stimpson | 198/833 |
| 4,625,874 | 12/1986 | Abe et al. | |
| 4,717,027 | 1/1988 | Laure et al. | 198/631 |

FOREIGN PATENT DOCUMENTS

| | | | |
|---|---|---|---|
| 87826 | 9/1921 | Fed. Rep. of Germany | 198/834 |
| 56-49942 | 11/1971 | Japan | |
| 737317 | 6/1980 | U.S.S.R. | 198/793 |

*Primary Examiner*—Joseph E. Valenza
*Attorney, Agent, or Firm*—Zarley, McKee, Thomte, Voorhees & Sease

[57] ABSTRACT

A horizontal rotary transfer apparatus comprises an endless linked belt in which a plurality of holding and connecting links are alternately connected via joints so that a pallet on the holding link may be transported. The links are engaged with and driven by a pair of polygonal rotary plates such as a rectangle and a regular triangle which is located at both ends of the belt, thereby reducing installation space of the apparatus.

2 Claims, 9 Drawing Sheets

HORIZONTAL ROTARY TRANSFER APPARATUS

This is a divisional of copending application Ser. No. 07/763,176 filed on Sep. 20, 1991, which is a continuation-in-part of Ser. No. 07/500,540 filed on Mar. 28, 1990 now abandoned.

BACKGROUND OF THE INVENTION

The present invention relates to a horizontal rotary transfer apparatus in which an endless linked belt is horizontally rotated so that loaded material such as pallets may be transferred.

For example, there is a known horizontal rotatable transfer apparatus which comprises an endless belt as mentioned in Japanese Utility Model Pub. No. 56-49942, the apparatus being shown in FIG. 5.

In the known apparatus, there is a pair of circular rotary plate 1 around which cut-out portions 1a are provided at regular intervals, each rotary plate 1 being rotatably mounted around a vertical shaft 1b. A linked belt in which a plurality of holding links 2 and connecting links 3 are alternately connected is wound around a pair of circular rotary plates 1 and is driven by suitable power means, so that material 4 on the holding link 2 is horizontally transferred.

However, in the known apparatus in FIG. 5, the distance "W" between parallel runs of the linked belt is substantially the same as the diameter of the circular rotary plate 1, which brings about a useless wide space between the two runs.

To decrease the distance "W" between the two runs, if the diameter of the circular rotary plate 5 becomes smaller, it is necessary to shorten the length of the links 6 and 7 so as to match the size of the circular rotary plate 5, which causes unstable transporting of loaded material.

The main object of the present invention is to diminish pulsatory motion generated in driving the link train by constructing a link driving device as follows.

A link driving device in a horizontal rotary transfer apparatus using a pair of regular triangular rotors (111), in which a plurality of links (21, 22) of a unit length which corresponds to the length of a side of said regular triangular rotor (111), each of the rotors (111) is rotatably mounted on each of pair of vertical axes (112) respectively. The links (21) and (22) ((21) which is a leading link) and (22)) of unit length are connected one after another by joining pins (114) to form a pair of endless link trains so that the link trains can be circulated.

The link driving device comprises a pair of endless chains (115a), (115b) which are wounded with a pair of sprockets (116a), (117a), (116b) and (117b) respectively along said pair of endless link trains used to which a plurality of engaging members (118) are attached at an interval equal to the unit length of the link (21,22), a pair of driving shafts (122a) (122b) disposed on a common axis so that at least one of the sprockets (116a) (116b) (117a) (117b) wound with the endless chain can be driven via transmitting means, a differential gear means (124) which interconnects rotatably the driving gear means (124) which interconnects rotatably the driving shafts (122a 122b) at the same or different speed, and a driving means which drives the driving shafts (122a) (122b) through said differential gear means (124).

The link driving device of the present invention is constructed as afore-described.

Hereinafter referring to the accompanying drawings, detailed description of the present invention is given as follows.

SUMMARY OF THE INVENTION

According to the present invention, there is provided a horizontal rotary transfer apparatus, comprising an endless linked belt in which a plurality of holding and connecting links are alternately connected via joints to form an endless belt so that loaded material on the holding links may be transferred, and a pair of polygonal rotary plates spaced apart from each other, the side length of the polygonal rotary plate being equal to a major part of the length of each link engaged by that side, the pair of polygonal rotary plates being rotated synchronously and engaged with the links.

The rotary plate comprises a polygone, whereby the rotary plate smaller in size than a known circular rotary plate can drive the endless belt having a larger unit length smoothly and reliably.

BRIEF DESCRIPTION OF THE DRAWINGS

The other features and advantages will become more apparent from the following description with respect to the appended drawings, wherein.

PREFERRED EMBODIMENTS OF THE INVENTION

Figure 1:
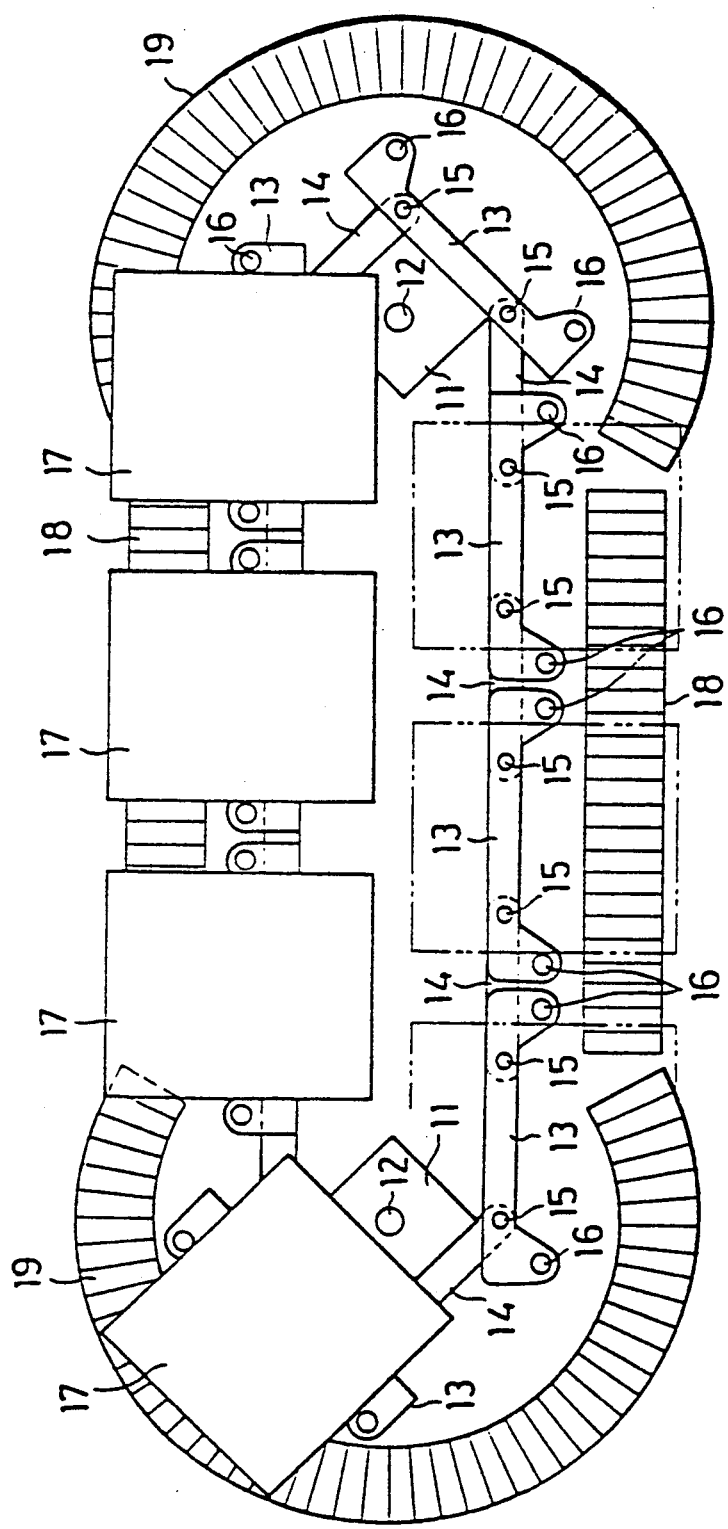
FIG. 1 is a schematic plan view of a first embodiment according to the present invention.
Figure 2:
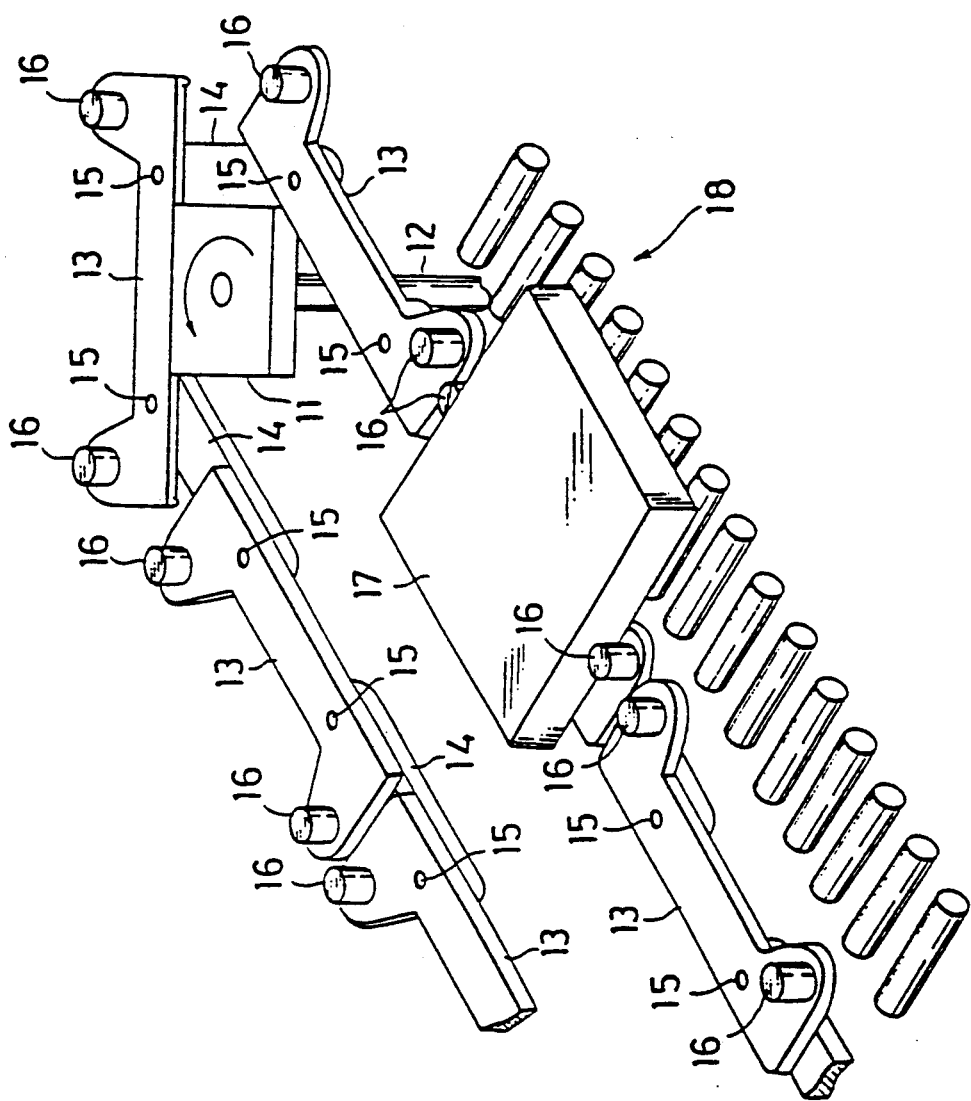
FIG. 2 is a perspective view of the main part thereof.

As shown in FIG. 1, there is provided a pair of square rotary plates 11, each of which is rotatably mounted around a vertical shaft 12. Around the pair of square rotary plates 11, there is an endless belt in which a plurality of holding and connecting links 13 and 14 are alternately connected via joints 15.

The distance between the joints 15 is corresponding to the side length of the square rotary plate 11, which is engaged with the insides of the links 13 and 14. The pair of rotary plates 11 is synchronously rotated so that the endless belt may be driven. The both ends of the holding link 13 extend outwardly to form a pair of holding members 16 made of urethane roller.

Transferred material such as a pellet, a container and a tray is held between the pair of holding members 16 on the holding link 13 and is transported along the endless linked belt. In this embodiment, to support and transport the material 17 reliably, there is provided a row of guide rollers 18 along the straight run of the endless belt, and a curved conveyor 19 along the curved run at both ends of the belt.

In the embodiment as shown, rotation of a pair of square rotary plates 11 allows the endless linked belt to run, but instead of the guide rollers 18, transportation means such as a slat conveyor may transfer the material 17. In this case, the endless linked belt is followed by the pair of rotary plates 11 which is freely rotated.

In the above embodiment, the endless linked belt is driven around the square rotary plate 11 which has a side length equal to the distance between the joints 15, whereby it can be driven and rotated by a rotary plate having a size smaller than a circular rotary plate in a known apparatus though the distance is the same. Thus, the distance between the parallel runs is shortened compared with a known apparatus, so that a surrounded space becomes smaller than that in the known apparatus, thereby decreasing installation space.

Figure 3:
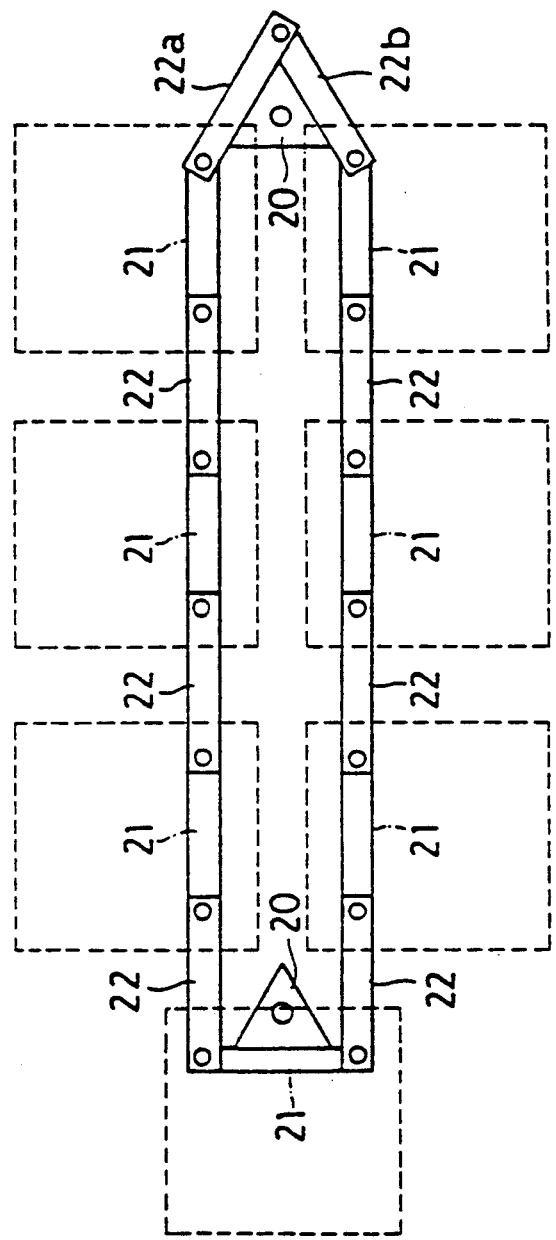
FIG. 3 is a schematic plan view which shows a second embodiment of the present invention.

In the above embodiment, the rotary plate is a square, but may be other polygones. FIG. 3 is a schematic plan view of a second embodiment in which a rotary plate comprises a regular triangle.

An endless belt comprises holding links 21 and connecting links 22. A pair of rotary plates is synchronously rotated as well as one in the first embodiment.

The endless linked belt comprises a plurality of holding links 21 and connecting links 22 alternately, but at only one position, the connecting links 22a and 22b are directly connected to each other without a holding link. This is because a pair of synchronously driven triangular rotary plates 20 allows an odd number of the links which constitute the endless linked belt.

To allow an even number of the links, if one of the rotary plates 20 is located in an opposite direction to the other, i.e. in a shape which rotates at 180 degrees, rotation of the rotary plate 20 varies a straight length between the pair of rotary plates, which periodically increases and decreases tension in the links of the straight runs, thereby loosening the belt, which does not allow smooth running.

In the second embodiment, at one position of the endless linked belt, the holding link 21 is omitted and the connecting links are directly connected to allow an odd number of the links and assure smooth running.

Figure 4:
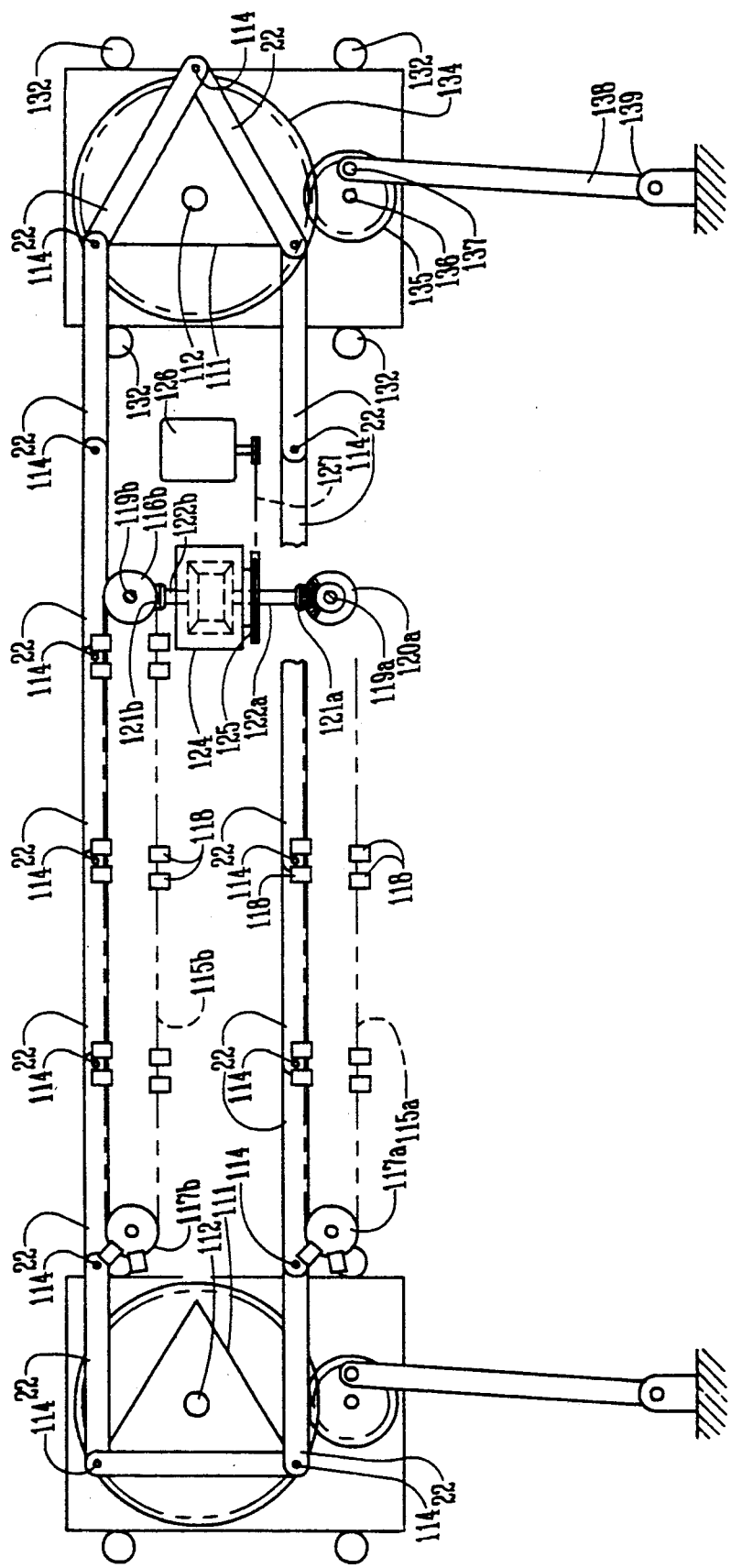
FIG. 4 is a plan view showing a horizontal rotary transfer apparatus applying a link driving device according to the present invention.

Referring to FIG. 4, a pair of regular triangular rotors (111) are supportedly mounted on a pair of vertical axes (112) respectively, and a plurality of links (21) (22) are connected one after another by joining pins (114) to make belt-like link trains so that they wind a pair of rotors (111). Each of the joining pins (114) is projected from the upper surface of each of the links (21) (22). Each of the portions projected from the surface is adapted to engage with each of engaging members (116) mounted on each of chains (115a) (115b).

In the present invention it is constructed that the rotor (111) is not driven, but the link trains are driven, and each of the vertical axes (112) of the respective rotors (111) is rotatably supported so that each of the rotors (111) can follow to travelling motion of each of the link trains.

Along each of the two link trains there are provided two endless chains (115a) (115b) for driving respective link trains. The front chains (115a) (in FIG. 4 this is shown in the lower part) is wound with the driving side sprocket (116a) (not shown in FIG. 4) and the follower side sprocket (117a); and the rear side chain (115b) (in FIG. 4 this is shown in the upper portion) is wound with the driving side sprocket (116b) and the follower side sprocket (117b). Both of them are adapted to rotate in the horizontal plane.

Each of the chains (115a) (115b) is mounted at a position near the corresponding link trains respectively, and on each of the chains a plurality of double engaging members (118) are provided with an interval equal to a pitch of the joining pin (114) (effective length of the link (21,22)) of the link trains. Between the engaging members (118) of one pair one joining pin (114) is held.

On each the lower parts of each of shafts (119a) (119b) of the sprockets (116a) and (116b) of the driving side there are provided large bevel gears (120a) (120b) respectively, and the respective sprockets (116a) (116b) are rotated integrally with each of the large bevel gears (120a) (120b).

Figure 5:
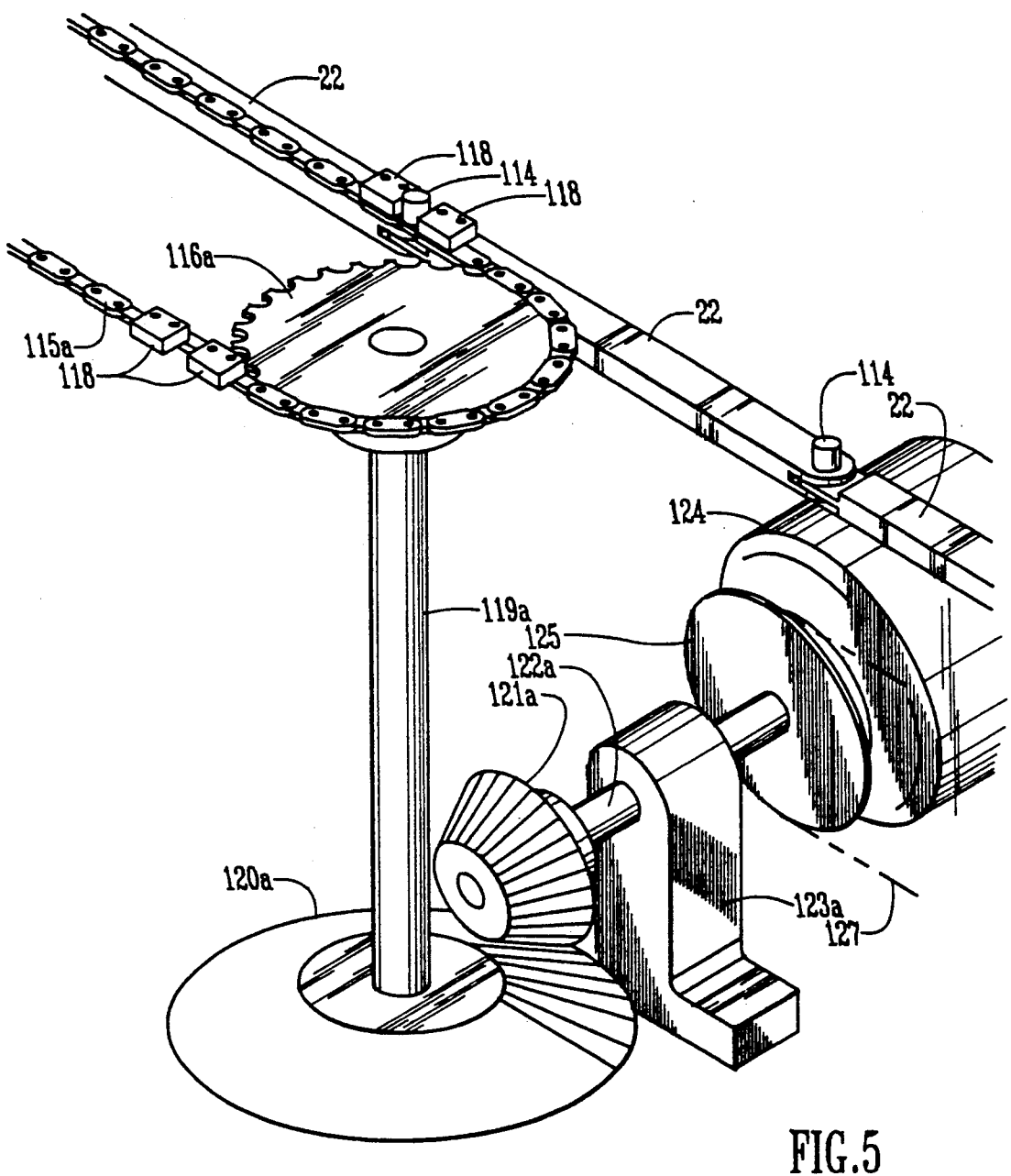
FIG. 5 is a perspective view showing essential parts of the link driving device according to the present invention.

FIG. 5 is a perspective view showing essential pars of the driving means of the front side chain (115a). The large bevel gear (120a) at the front side engages with a pulley (small bevel gear) (121a) secured to a driving shaft (122a). The large bevel gear (120b) at the rear side is engaged with a pulley (small bevel gear) (121b) which is secured to a driving shaft (122b). The driving shafts (122a) (122b) are supported by bearings (123a) (123b) on an axial line respectively, and connected with each other via a differential gear means (124).

At the front face of the differential gear means (124) there is secured a sprocket (125) which is coaxial with the driving shaft (122a). Between the sprocket (125) and a driving motor (126) there is stretched a chin (127).

Figure 6:
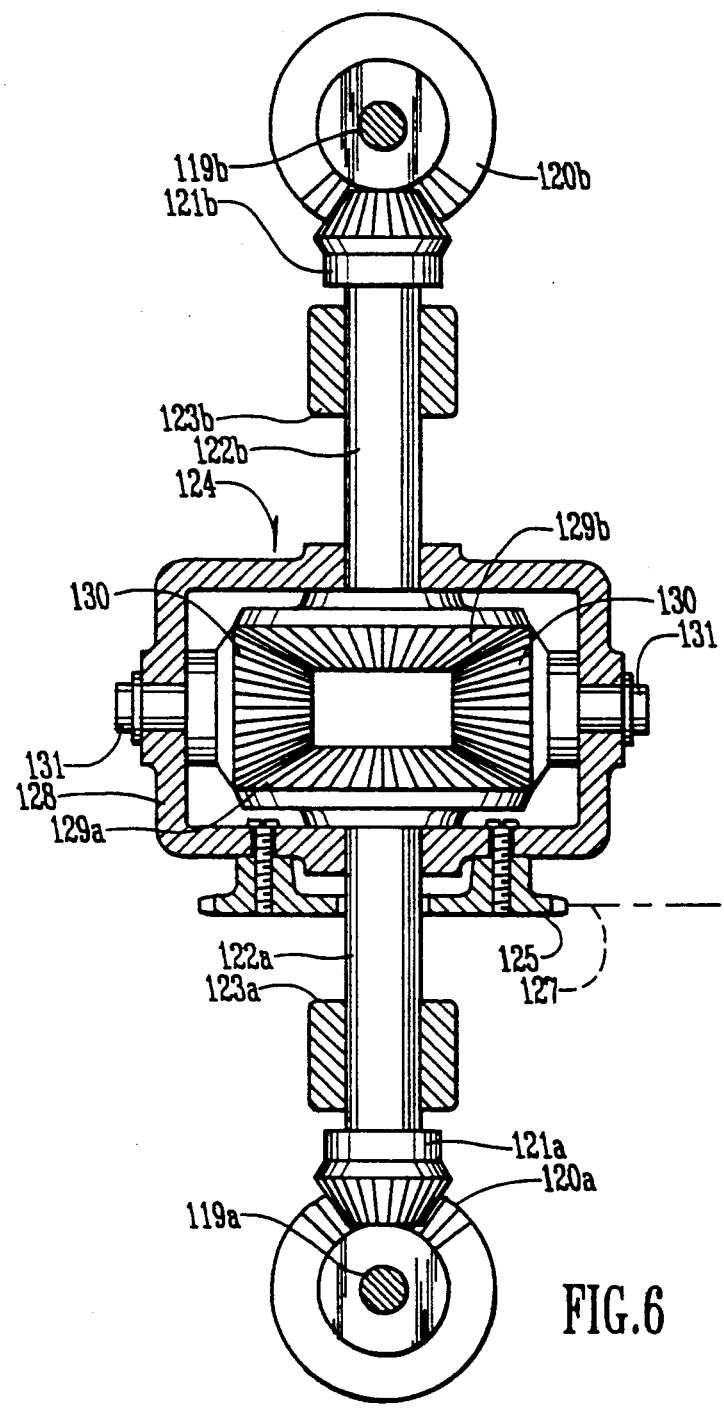
FIG. 6 is a sectional plan view of a differential gear means according to the present invention.

In FIG. 6, there is shown construction of the differential gear means (124). Construction of the differential gear means is resembled with those which are widely applied to automobiles. Therefore, detailed explanation thereof is abbreviated in this case. In the drawings the front side driving shaft (122a) is fitted into a hollow tubular gear box (128), and the rear side driving shaft (122b) is also fitted into the gear box (128). Each of the large bevel gears (129a) and (129b) is secured to the respective driving shafts (122a) and (122b) in the hollow gear box (128). Further, a pair of small bevel gears (130) are mounted on the tubular periphery of the gear box (128) with supporting axes (131) so as to intersect at right angles with the driving shafts (122a) (122b), and those four bevel gears are engaged with one another.

Operation of the differential gear means (124) is as that of the usual one, so that further description is abbreviated.

In the link driving device shown in FIG. 4, in order to drive the link trains under the condition that the front and the rear chains (115a) and (115b) are disposed at constant positions, it is necessary to construct travelling courses of the link trains not to be moved.

Figure 7:
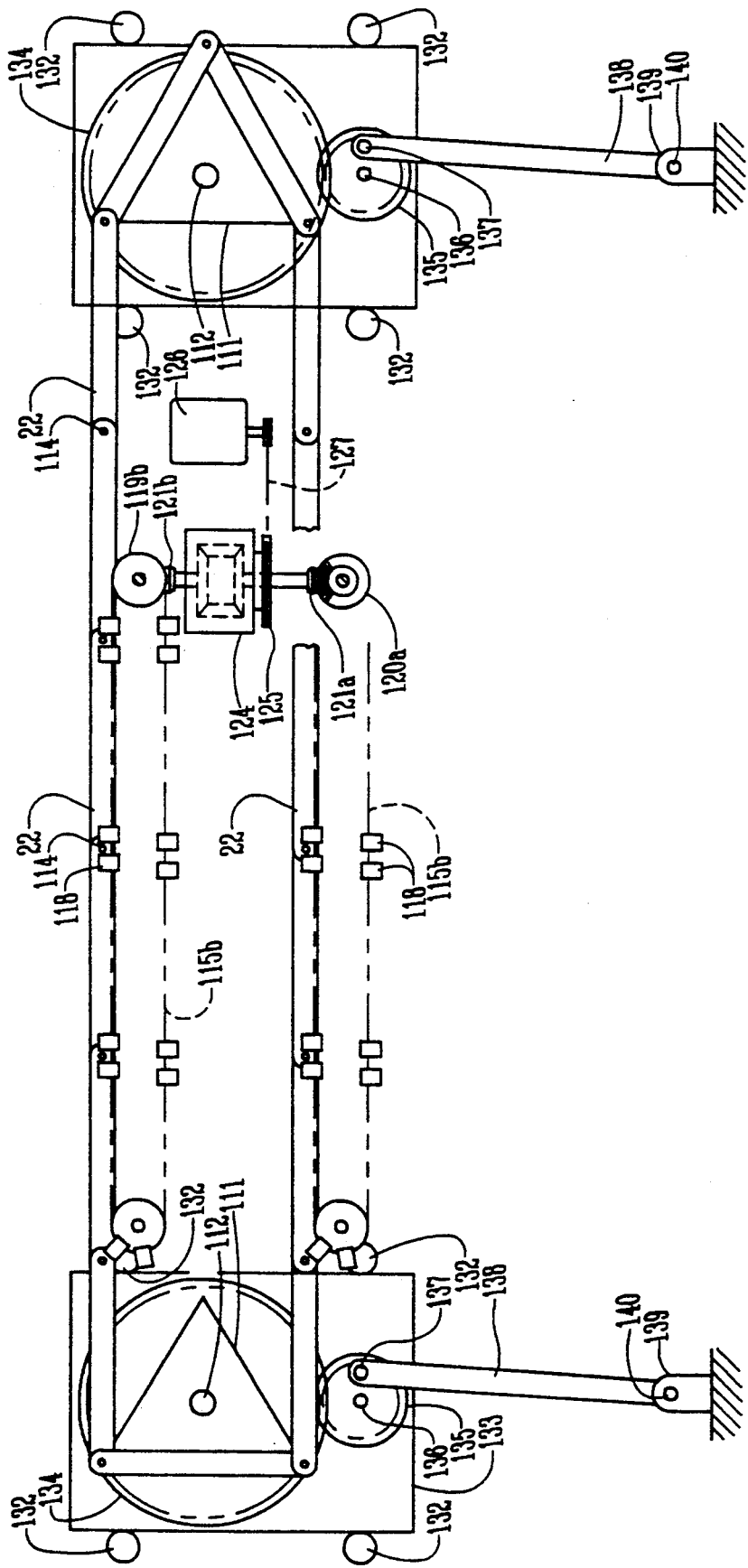
FIG. 7 is a plan view of the horizontal rotary transfer apparatus using a regular triangular rotor to which a link position correcting device according to the present invention.
Figure 8:
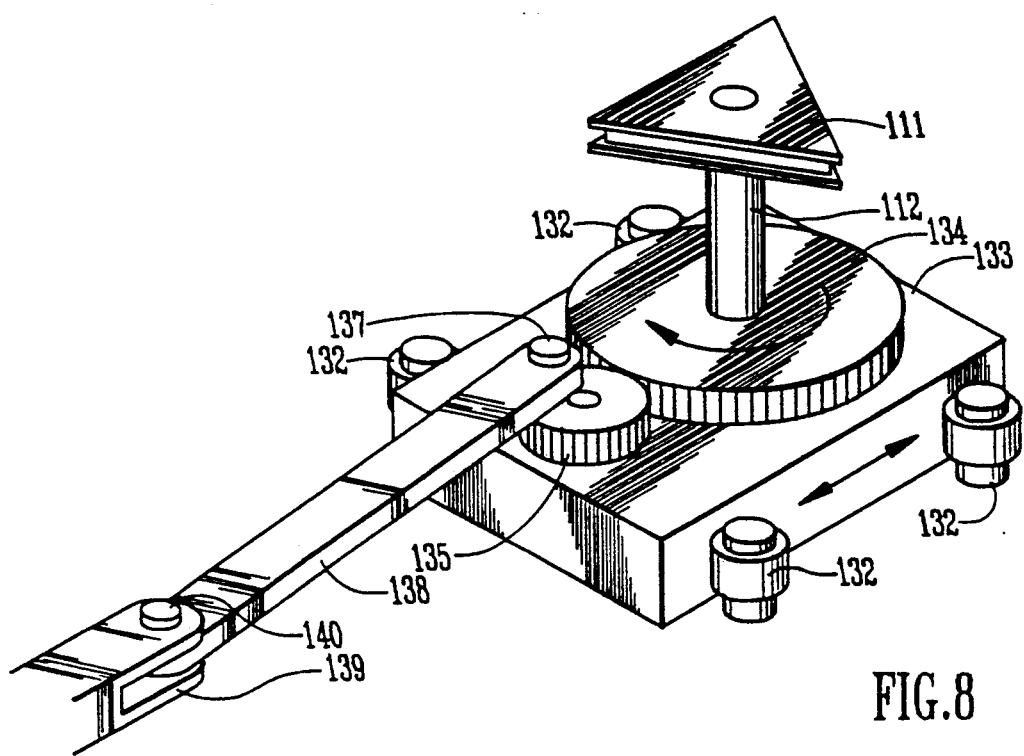
FIG. 8 is a perspective view of a link position correcting device according to the present invention.

In FIG. 7 there is shown a link position correcting device in a horizontal rotary transfer apparatus using a pair of regular triangular rotors (111). The link position correcting device comprises a pair of transferring platforms (133) each of which supports each of the vertical axes (112) for said respective rotors (111) and are disposed movably to a direction perpendicular to the travelling direction of the link trains, a pair of driving means each of which reciprocally moves each of the transferring platforms (133) in synchronization with the rotation of the respective rotors (111) at a period of one reciprocal movement per one third rotation of the rotor (111), and with a stroke corresponding to a differential distance between a distance from the rotational center (112) of the regular triangular rotor (111) to the apex of said rotor (111) and distance from a side of the triangle.

Thereby positional deviation to the travelling direction side of said link train resulting from the rotation of the rotor (111) is cancelled by the movements of the transferring platforms (133) to travel the link trains along fixed courses.

Referring to FIG. 7, the link position correcting devices are shown at both the right and the left sides in the figure. The rotational shafts (112) of the rotors (111) are mounted rotatably on the transferring platforms (133) respectively, and the platforms (133) are supported by a plurality of guiding rollers (132), and can slide in a direction perpendicular to a line which connects centers of the two rotors (111). To each of the rotational shafts (axes) (112) the large gear (134) is secured, and rotated together with the rotor (111).

A pulley (small gear) (135) is pivotally mounted on an axis (136) which is disposed at an appropriate position of the transferring platform (133). The pulley (135) is engaged with a large gear wheel (134). Ratio of the number of teeth of the large gear wheel (134) to that of the pulley (135) is set to 3:1, and during one rotation of the large gear wheel (134) and the rotor (111), the pulley rotates three times.

At an eccentric position from the center on the upper surface of the pulley (135), a crank pin (137) is disposed by which one end of a rod (138) is pivotted. The other end of the rod (138) is pivotally secured to a bearing (139) mounted on an extension of a line connecting the centers of the large gear wheel (134) and the pulley (135) by an axis (140).

The distance (r) from the center of the pulley (135) to the crank pin (137) is made a half of a distance from the center of the rotor (111) to a side of a regular triangular rotor (111). As shown in FIG. 9, in an angular position at which one of the apexes of the rotor (111) directs toward the center of the pulley (135), it is adapted that the crank pin (137) is positioned at the opposite side of the rotational shaft (axis) (112) of the rotor (111) on the line connecting the both centers of the large gear wheel (134) and the pulley (135).

The link position correcting device according to the present invention is constructed, so that when the link trains are travelled by applying the afore-described link driving device, the pair of rotors (111) are rotated following to the link train(s), and rotates the large gear wheel (134) via the rotational shaft (112). The pulley (135) engaging with the large gear wheel (134) is rotated with a speed of three times as that of the large gear wheel. The rod (138) pivotally secured to the crank pin (137) mounted on the pulley (135) is pivotally supported by the bearing (139) at one end, accordingly, the transferring platform (133) reciprocally moves along the guiding rollers (132).

Figures 9A, 9B:
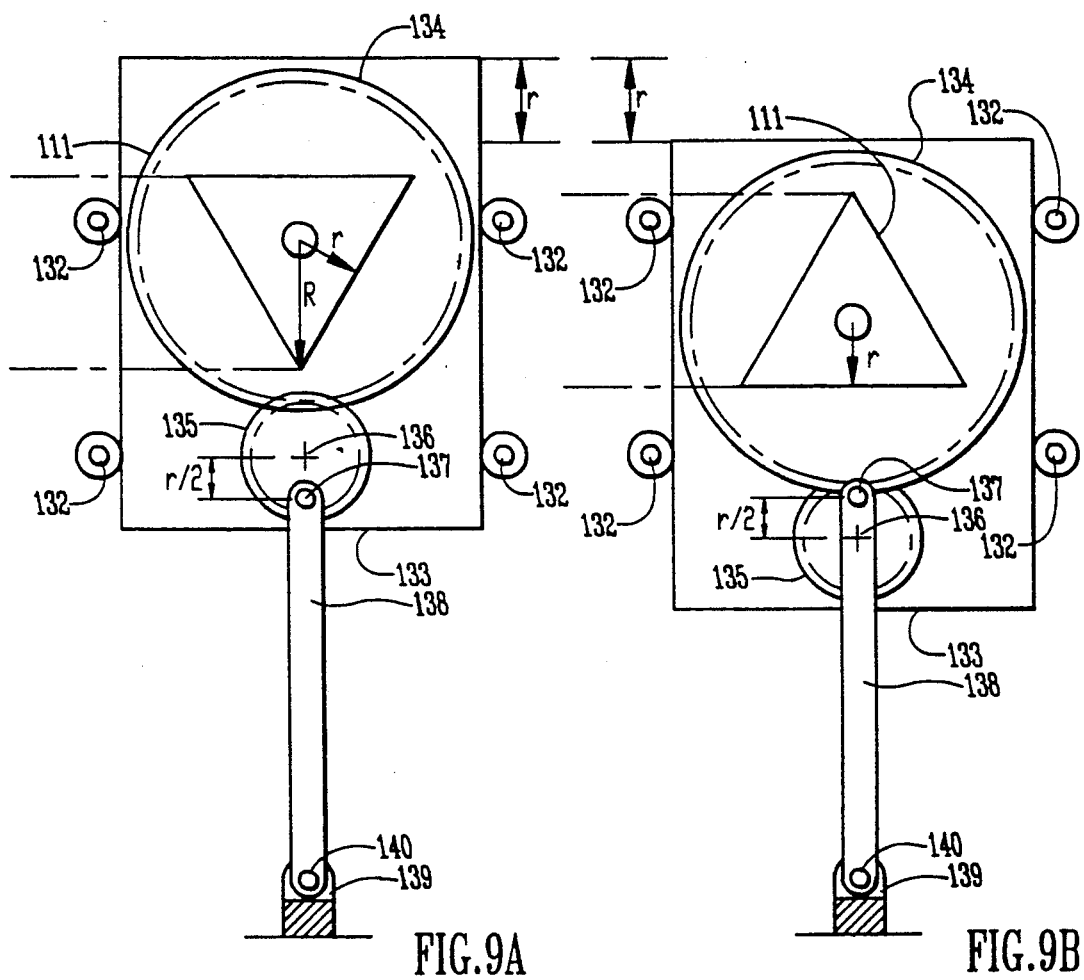
FIGS. 9(A) and 9(B) are plan views illustrating operation of the present invention.

FIG. 9(A) shows a state in which one of the apexes of the regular triangular rotor (111) is at an angular position coinciding with a line connecting both the centers of the large gear wheel (134) and the pulley (135), and FIG. 3(B) shows another state in which the rotor (111) is rotated at 60 degrees from the state shown in FIG. 9(A). The large gear wheel (134) shown in FIGS. 9(A) and 9(B) is rotated together with the rotor (111) 60 degrees, that is, 1/6 rotation, while the pulley (135) engaging with the large gear wheel (134) rotates ½ rotation. Since one end of the rod (138) is pivotally supported by the bearing disposed at a fixed position, position of the crank pin (137) is quite same in FIG. 9(A) and FIG. 9(B), and the transferring platform (133) rocks with a stroke r which is twice of the rotational radius r/2 of the crank pin (137). That is, deviated distance of the link train caused by the rotation of the regular triangular rotor (111) is cancelled by synchronizingly moving the rotor (111) reciprocally with a corresponding stroke thereto in the opposite directions. Thus, the link train can be travelled along a constant course.

Effects of the present invention are as follows.

(1) In a horizontal rotary transfer apparatus applying regular triangular rotors (111), deviation caused by difference between distance from the center of the rotor (111) to the apex and that of to a side of the triangular rotor (111) can be appropriately corrected to travel the link train along a constant course.

(2) In the case of the link train not being driven by rotation of the rotor but engaging driving means directly to the link train, the travelling course can be maintained to a fixed one, so that connection with the driving means is easy and assured driving can be expected.

In the above embodiments, if desired, a plurality of apparatus may be vertically piled to construct a multiple layered apparatus, in which the whole layers of the transfer apparatus may be simultaneously driven and rotated, or each layer may be independently driven.

In the above embodiments, material which is put between the holding members is transported, but the present invention is also applicable to a transfer apparatus in which a holder for loaded material such as a pallet is provided on a holding link.

The horizontal rotary transfer apparatus according to the present invention allows a middle space to reduce, thereby decreasing installation space.

The foregoing relates to only preferred embodiments of the invention, and variations and modifications may be made by person skilled in the art without departing from the scope of appended claims:

I claim:

1. A link position correcting device in a horizontal rotary transfer apparatus using a pair of regular triangular rotors, in which a plurality of links of a unit length corresponding to the length of sides of a pair of regular triangular rotors each being rotatably mounted on a pair of vertical axes respectively rae connected with one after another to form a pair of endless link trains so that said endless link trains may be circulated, characterized by comprising:

a pair of transferring platforms each of which supports each of said vertical axes for said respective rotors and are disposed movably to a direction perpendicular to the travelling direction of said link trains; and a pair of driving means each of which synchronizingly and reciprocally moves each of said transferring platforms with rotation of said respective rotors at a period of one reciprocal movement per one third rotation of said rotor, and with a stroke corresponding to a differential distance between a distance from the rotational center of said regular triangular rotor to the apex of said rotor and that of from a side of said triangle; whereby positional deviation to the travelling direction side of said link train resulting from the rotation of said triangular rotor is cancelled by the movements of said transferring platforms to travel said link trains along a constant course.

2. A link position correcting device as defined in claim 1, wherein said driving means of each of said pair of transferring platforms is composed of;

a large gear secured to said rotating shaft of said rotor and rotated integrally with said rotor;

a pinion pivotally supported by said shaft mounted on said transferring platform so that it may engage with said large gear and moves therewith, and having teeth the number of which is one third of that of said large gear;

a crank pin provided on the upper surface of said pinion at a distance of one half of a transferring stroke from the center of said pinion; and a rod one end of which is pivotally secured to said crank pin and the other end of which is pivotted to a bearing fixed on an extension of a line connecting the center of said large gear with that of said pinion.

* * * * *